(12) United States Patent
Kanamori et al.

(10) Patent No.: US 10,718,681 B2
(45) Date of Patent: Jul. 21, 2020

(54) DETECTING DEVICE AND DETECTING SYSTEM

(71) Applicants: CITIZEN FINEDEVICE CO., LTD., Minamitsuru-gun, Yamashi (JP); CITIZEN WATCH CO., LTD., Nishitokyo-shi, Tokyo (JP)

(72) Inventors: Yuta Kanamori, Minamitsuru-gun (JP); Tetsuya Aiba, Minamitsuru-gun (JP); Masanori Yomoyama, Minamitsuru-gun (JP); Satoshi Sue, Minamitsuru-gun (JP)

(73) Assignees: CITIZEN FINEDEVICE CO., LTD., Yamanashi (JP); CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 16/082,362

(22) PCT Filed: Feb. 27, 2017

(86) PCT No.: PCT/JP2017/007316
§ 371 (c)(1),
(2) Date: Sep. 5, 2018

(87) PCT Pub. No.: WO2017/154627
PCT Pub. Date: Sep. 14, 2017

(65) Prior Publication Data
US 2019/0078958 A1    Mar. 14, 2019

(30) Foreign Application Priority Data

Mar. 9, 2016 (JP) .................................. 2016-045559

(51) Int. Cl.
*H05K 9/00*     (2006.01)
*G01L 23/22*    (2006.01)
(Continued)

(52) U.S. Cl.
CPC ............ *G01L 23/22* (2013.01); *F02B 77/085* (2013.01); *G01D 3/08* (2013.01); *G01L 19/0084* (2013.01); *G01L 23/10* (2013.01); *G12B 17/02* (2013.01)

(58) Field of Classification Search
CPC ......... G01L 23/22; G01L 23/10; F02B 77/085
(Continued)

(56) References Cited

U.S. PATENT DOCUMENTS

| 5,902,957 A | 5/1999 | Takahashi et al. |
| 6,252,313 B1 * | 6/2001 | Zhang .................. H04B 15/005 |
| | | 307/91 |

(Continued)

FOREIGN PATENT DOCUMENTS

| EP | 1111360 A2 | 6/2001 |
| JP | S63-182899 A | 7/1988 |

(Continued)

OTHER PUBLICATIONS

Feb. 5, 2019 Office Action issued in Japanese Patent Application No. 2016-045559.

(Continued)

*Primary Examiner* — Hai H Huynh
*Assistant Examiner* — Gonzalo Laguarda
(74) *Attorney, Agent, or Firm* — Oliff PLC

(57) ABSTRACT

A pressure detecting device that detects the combustion pressure in an internal combustion engine includes: a piezoelectric element that outputs a charge signal corresponding to the pressure in a combustion chamber; and a mounting board on which are mounted an integrating circuit that integrates the charge signal outputted by the piezoelectric (Continued)

element and an amplifier circuit that amplifies a voltage signal obtained by integration. On the mounting board are provided: a power receiving terminal that receives a power-supply voltage from a controller; an output terminal that outputs an output signal after amplification to the controller; and a grounding terminal for making the ground of the controller and the mounting board common. Furthermore, in the mounting board, the grounding terminal and grounding ends of the integrating circuit and the amplifier circuit are connected by way of grounding ferrite beads.

9 Claims, 12 Drawing Sheets

(51) Int. Cl.
*G01L 23/10* (2006.01)
*G01L 19/00* (2006.01)
*G01D 3/08* (2006.01)
*G12B 17/02* (2006.01)
*F02B 77/08* (2006.01)

(58) Field of Classification Search
USPC .............. 123/435; 701/111; 73/35.07, 35.12, 73/114.18
See application file for complete search history.

(56) References Cited

U.S. PATENT DOCUMENTS

| | | | |
|---|---|---|---|
| 2006/0262713 A1* | 11/2006 | Karam | H04L 12/10 370/200 |
| 2007/0264022 A1 | 11/2007 | Hakomori et al. | |
| 2009/0256662 A1* | 10/2009 | Ellis | H01H 1/66 335/151 |
| 2010/0258349 A1 | 10/2010 | Sugihara et al. | |
| 2013/0249029 A1* | 9/2013 | Vig | G01R 33/0047 257/427 |

FOREIGN PATENT DOCUMENTS

| | | |
|---|---|---|
| JP | 2866054 B2 | 3/1999 |
| JP | 3297215 B2 | 7/2002 |
| JP | 3488758 B2 | 1/2004 |
| JP | 2007-011608 A | 1/2007 |
| JP | 4540680 B2 | 9/2010 |
| JP | 4748376 B2 | 8/2011 |
| JP | 2013-156171 | 8/2013 |
| JP | 5901982 B2 | 4/2016 |

OTHER PUBLICATIONS

Mar. 21, 2017 International Search Report issued in International Patent Application No. PCT/JP2017/007316.
Sep. 24, 2019 Search Report issued in European Patent Application No. 17762967.2.

* cited by examiner

FIG.8

| | POWER RECEIVING FERRITE BEADS /MODEL NUMBERS (STATIC CHARACTERISTIC NOMINAL VALUE) | OUTPUT FERRITE BEADS /MODEL NUMBERS (STATIC CHARACTERISTIC NOMINAL VALUE) | GROUNDING FERRITE BEADS /MODEL NUMBERS (STATIC CHARACTERISTIC NOMINAL VALUE) |
|---|---|---|---|
| EXAMPLE1 | FB7 (1000Ω) | FB7 (1000Ω) | FB1 (5Ω) |
| EXAMPLE2 | 〃 | 〃 | FB2 (10Ω) |
| EXAMPLE3 | 〃 | 〃 | FB3 (22Ω) |
| EXAMPLE4 | 〃 | 〃 | FB4 (47Ω) |
| EXAMPLE5 | 〃 | 〃 | FB5 (120Ω) |
| EXAMPLE6 | 〃 | 〃 | FB6 (470Ω) |
| EXAMPLE7 | 〃 | 〃 | FB7 (1000Ω) |
| COMPARATIVE EXAMPLE | | | NONE |

FIG.9A  FB1 (5Ω)
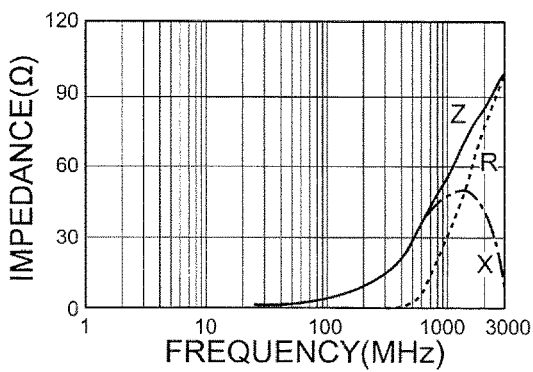
FIG.9B  FB2 (10Ω)
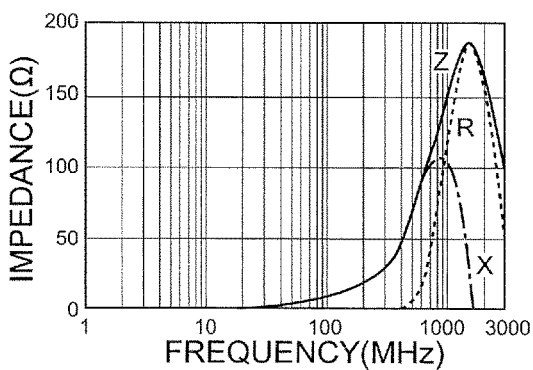
FIG.9C  FB3 (22Ω)
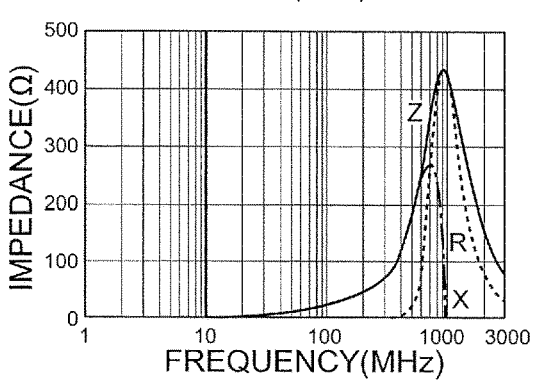
FIG.9D  FB4 (47Ω)
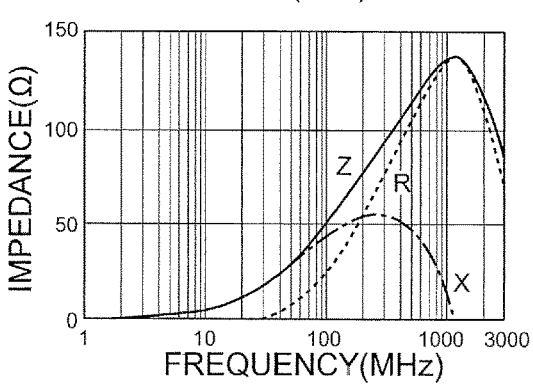
FIG.9E  FB5 (120Ω)
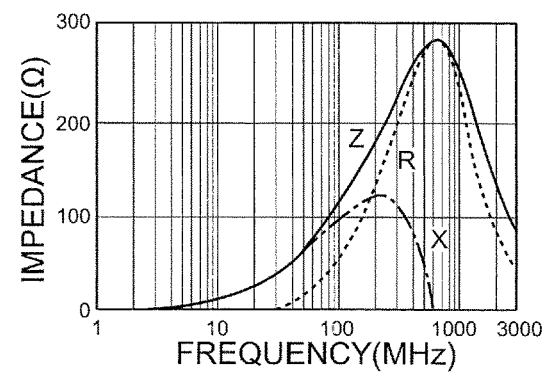
FIG.9F  FB6 (470Ω)
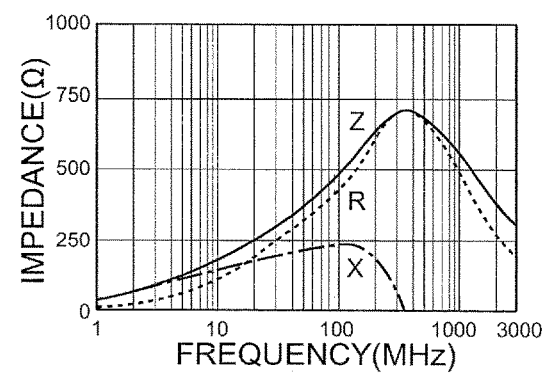
FIG.9G  FB7 (1000Ω)
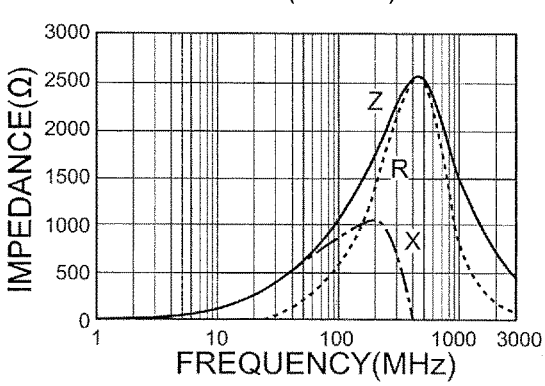

FIG.10

| FERRITE BEADS /MODEL NUMBERS | STATIC CHARACTERISTIC NOMINAL VALUE (Ω) | R-X CROSS POINT (MHz) | SELF-RESONANT FREQUENCY (MHz) |
|---|---|---|---|
| (A) FB1 | 5 | 1300 | EXCEEDING 3000 |
| (B) FB2 | 10 | 1000 | 1700 |
| (C) FB3 | 22 | 800 | 1000 |
| (D) FB4 | 47 | 200 | 1100 |
| (E) FB5 | 120 | 180 | 600 |
| (F) FB6 | 470 | 18 | 370 |
| (G) FB7 | 1000 | 180 | 420 |

FIG.12

| EXAMPLE/ COMPARATIVE EXAMPLE | BASIC BCI TEST RESULTS (MEASUREMENT FREQUENCY: 0~400MHz) | | | EXTENDED BCI TEST RESULTS (MEASUREMENT FREQUENCY: 0~1000MHz) | | |
|---|---|---|---|---|---|---|
| | VARIATION AMOUNT OF OUTPUT VOLTAGE(mV) | | | VARIATION AMOUNT OF OUTPUT VOLTAGE(mV) | | |
| | MAX | MIN | VARIATION AMOUNT | MAX | MIN | VARIATION AMOUNT |
| EXAMPLE1 | 0 | -11 | 11 | 2 | -11 | 11 |
| EXAMPLE2 | 0 | -5 | 5 | 3 | -20 | 20 |
| EXAMPLE3 | 0 | -3 | 3 | 0 | -35 | 35 |
| EXAMPLE4 | 0 | -2 | 2 | 0 | -54 | 54 |
| EXAMPLE5 | 1 | -1 | 1 | 208 | -53 | 208 |
| EXAMPLE6 | 0 | -2 | 2 | 1515 | -46 | 1515 |
| EXAMPLE7 | 0 | -3 | 3 | 1515 | -28 | 1515 |
| COMPARATIVE EXAMPLE | 0 | -56 | 56 | 1515 | -56 | 1515 |

DETECTING DEVICE AND DETECTING SYSTEM

TECHNICAL FIELD

The present invention relates to a detecting device and a detecting system that detect a physical amount.

BACKGROUND ART

For example, installation of a combustion pressure detecting device that detects the combustion pressure of an internal combustion engine on a device having the internal combustion engine, such as a vehicle, is under consideration. In such a device, based on the detection result of the combustion pressure by the combustion pressure detecting device, a controller called an ECU (Engine Control Unit) performs control related to operations or the like of the internal combustion engine.

For example, in Patent Document 1, it is described that a pressure detecting device incorporating a piezoelectric element that detects a combustion pressure of an internal combustion engine and a processing circuit that applies processing to detection signals of the piezoelectric element is connected to a controller that performs control based on output signals outputted from the processing circuit by use of an electric wire for supplying power from the controller to the pressure detecting device, an electric wire for transmitting signals from the pressure detecting device to the controller and an electric wire for making grounds of the controller and the pressure detecting device common.

CITATION LIST

Patent Literature

Patent Document 1: Japanese Patent Application Laid-Open Publication No. 2013-156171

SUMMARY OF INVENTION

Technical Problem

Here, when the configuration that connects the controller and the detecting device via the electric wire is employed, the electric wire functions as an antenna for radio waves or the like from the outside in some cases. Then, noises came into the processing circuit of the detecting device, and as a result, the noises were sometimes superimposed on the signals outputted from the processing circuit.

An object of the present invention is to reduce noises coming into the processing circuit of the detecting device from the outside.

Solution to Problem

A detecting device according to the present invention includes: a detection element that detects a change in a physical amount; a processing circuit that applies electrical processing to a detection signal outputted by the detection element; a grounding terminal connected to a ground body provided outside; and an inductive element that shows inductivity and is connected to the grounding terminal and a ground in the processing circuit.

Here, it is preferable that the inductive element is composed of an inductive/resistive element in which a reactance component becomes predominant in a low-frequency region and a resistance component becomes predominant in a high-frequency region.

Moreover, it is preferable that magnitude of the reactance component of the inductive/resistive element exceeds $0\Omega$ in a frequency range of more than 0 Hz and not more than 400 MHz.

Further, it is preferable that magnitude of an impedance of the inductive/resistive element exceeds $0\Omega$ and not more than $50\Omega$ at 100 MHz.

Still further, it is preferable that the inductive/resistive element is composed of ferrite beads, and a self-resonant frequency of the ferrite beads exceeds 400 MHz.

Moreover, from another standpoint, a detecting system according to the present invention includes: a detecting device including: a detection element that detects a change in a physical amount; a processing circuit that applies electrical processing to a detection signal outputted by the detection element; a grounding terminal connected to a ground body provided outside; and an inductive element that shows inductivity and is connected to the grounding terminal and a ground in the processing circuit; and a supplying/processing device that is connected to the detecting device via a supply line for supplying power-supply voltage to the processing circuit, a transmission line for transmitting an output signal outputted from the processing circuit and a ground line to be connected to the grounding terminal of the processing circuit, to supply the power-supply voltage to the detecting device and to apply processing to the output signal inputted from the detecting device.

Advantageous Effects of Invention

According to the present invention, it is possible to reduce noises coming into the processing circuit of the detecting device from the outside.

BRIEF DESCRIPTION OF DRAWINGS

FIG. 8 is a diagram for explaining model numbers of power receiving ferrite beads, output ferrite beads and grounding ferrite beads used in each Example and Comparative example;

FIGS. 9A to 9G are diagrams for illustrating frequency characteristics of impedance of various kinds of ferrite beads used in each Example and Comparative example;

FIG. 10 is a diagram for explaining various kinds of characteristics of the various kinds of ferrite beads used in each Example and Comparative example as a list;

FIG. 12 is a diagram for explaining the result of the BCI test in each Example and Comparative example as a list.

DESCRIPTION OF EMBODIMENTS

Hereinafter, an exemplary embodiment according to the present invention will be described in detail with reference to attached drawings.

Figure 1:
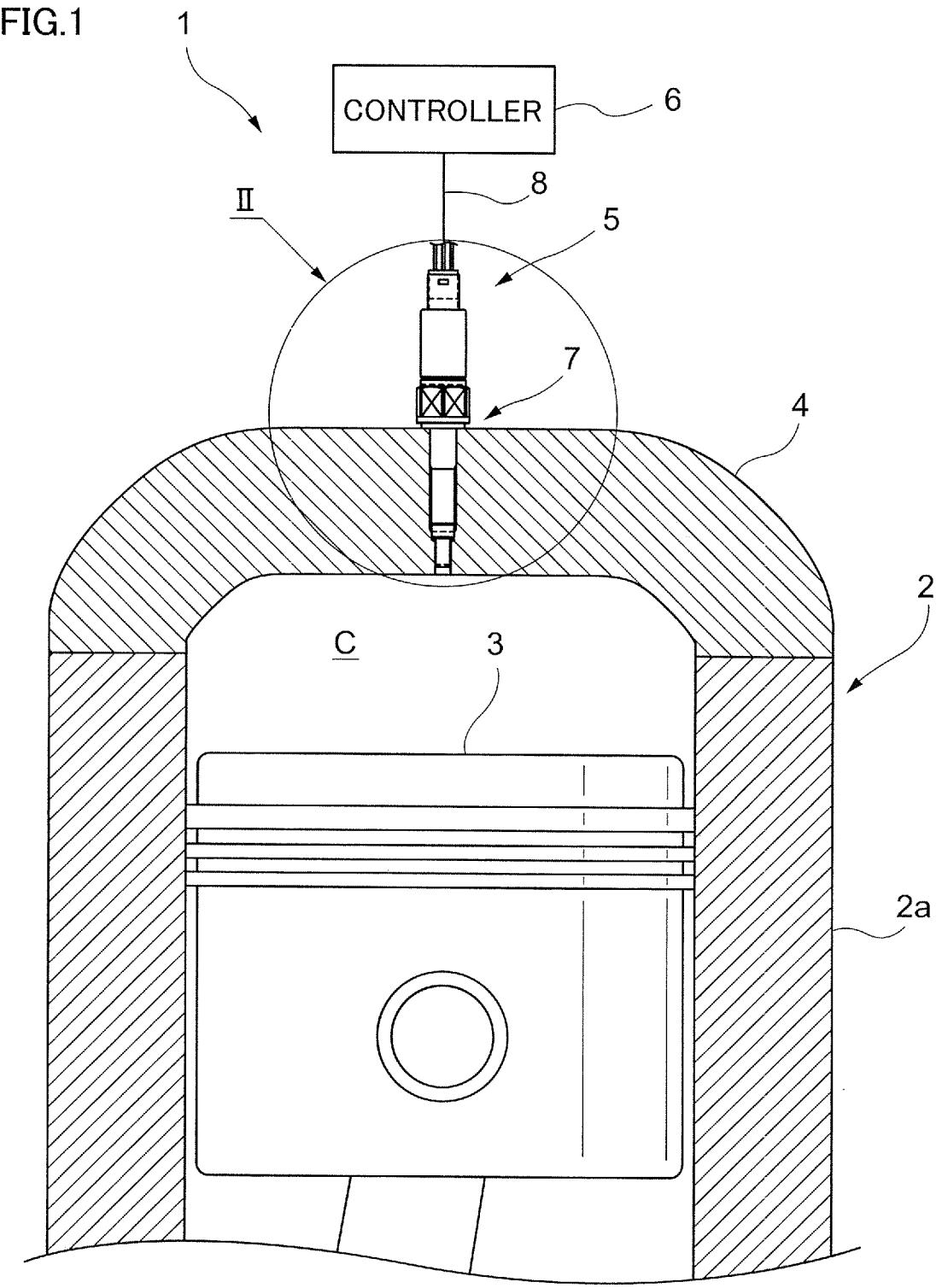
FIG. 1 is a schematic configuration view of an internal combustion engine related to an exemplary embodiment.

FIG. 1 is a schematic configuration view of an internal combustion engine 1 related to the exemplary embodiment. Moreover, FIG. 2 is an enlarged view of a II part of a pressure detecting device 5 shown in FIG. 1.

The internal combustion engine 1 includes: a cylinder block 2 provided with a cylinder 2a; a piston 3 that reciprocates inside the cylinder 2a; and a cylinder head 4 that is fastened to the cylinder block 2 to form a combustion chamber C together with the cylinder 2a, piston 3 and so forth. Here, both the cylinder block 2 and the cylinder head 4 are composed of aluminum, cast iron or the like having conductivity. Moreover, the internal combustion engine 1 includes: a pressure detecting device 5 that is mounted onto the cylinder head 4 to detect the pressure in the combustion chamber C; a controller 6 that controls action of the internal combustion engine 1 based on the pressure detected by the pressure detecting device 5; a sealing member 7 that is interposed between the pressure detecting device 5 and the cylinder head 4 to keep airtightness in the combustion chamber C; and a transmission cable 8 that transmits electric signals between the pressure detecting device 5 and the controller 6. Here, in the exemplary embodiment, the pressure detecting device 5 functions as an example of a detecting device, the controller 6 functions as an example of a supplying and processing device, and further, the pressure detecting device 5, the controller 6 and the transmission cable 8 function as an example of a detecting system.

Figure 2:
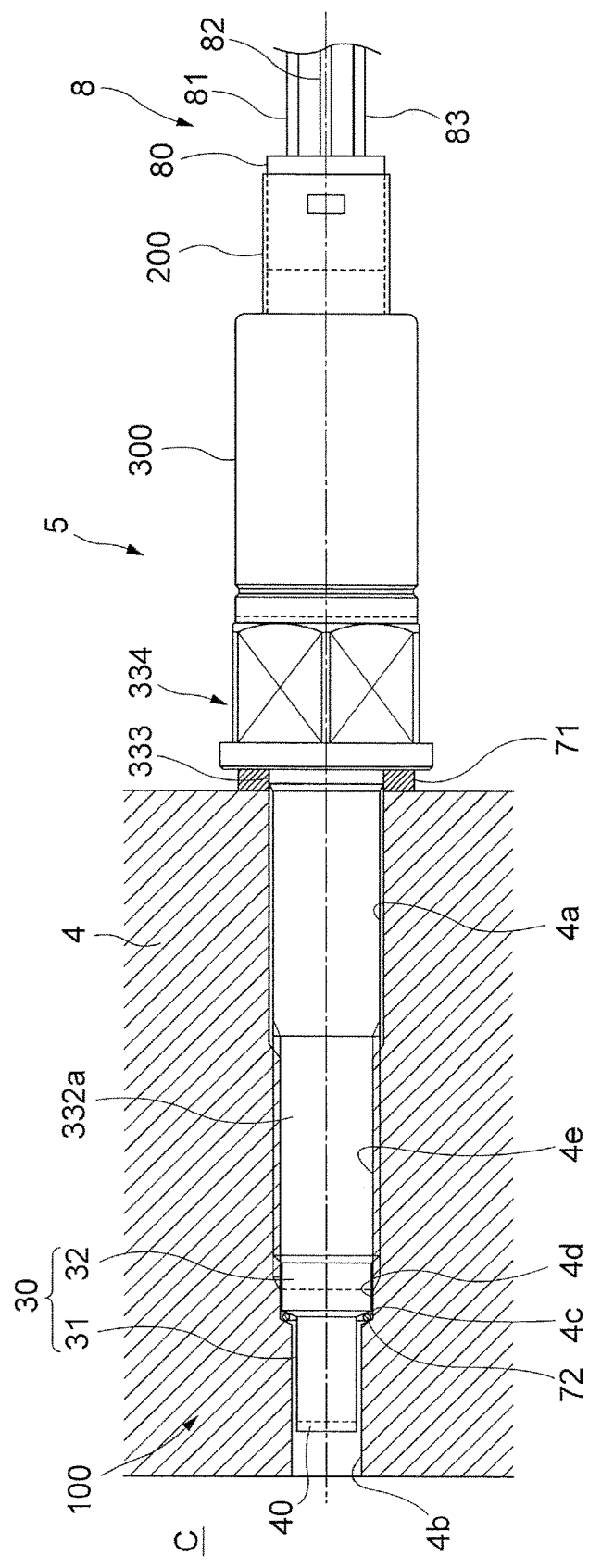
FIG. 2 is an enlarged view of a II part of a pressure detecting device shown in FIG. 1.

Then, as shown in FIG. 2, the transmission cable 8 includes three cables, namely, a first cable 81, a second cable 82 and a third cable 83, and a connector 80 for connecting these first cable 81 through third cable 83 to the pressure detecting device 5. Of these, the first cable 81 is used for supplying the power-supply voltage from the controller 6 to the pressure detecting device 5. Moreover, the second cable 82 is used for transmitting an output signal corresponding to the detected pressure from the pressure detecting device 5 to the controller 6. Further, the third cable 83 is used for making the ground of the pressure detecting device 5 and the ground of the controller 6 in common. Here, each of the first cable 81, the second cable 82 and the third cable 83 is configured with an electrical insulated wire formed by coating the outer circumferential surface of a conductor part made of a tinned annealed copper strand wire with an insulating body made of resin. Note that, in the exemplary embodiment, the first cable 81 functions as an example of a supply line, the second cable 82 functions as an example of a transmission line, and the third cable 83 functions as an example of a ground line. Note that, the third cable 83 is connected to a ground body, such as a battery vehicle body of a vehicle, on which the internal combustion engine 1 is mounted, or the like (not shown) via the ground of the controller 6.

In transmission cable 8 of the exemplary embodiment, a twisted pair cable is composed by pair-stranding the second cable 82 and the third cable 83. Then, to the twisted pair cable, a drain wire composed of a tinned annealed copper strand wire (not shown) is vertically added, and around the cable, an aluminum Mylar tape (not shown) in which aluminum deposition is applied to one surface of a PET tape (the side in contact with the drain wire) is wound. Note that the drain wire may be stranded with the second cable 82 and the third cable 83, and the aluminum Mylar tape may be vertically added. On the other hand, the first cable 81 in the transmission cable 8 results in existing outside of the aluminum Mylar tape. Then, the drain wire provided to the transmission cable 8 is one-end grounded or both-end grounded. This causes the second cable 82 and the third cable 83 to be subjected to electrostatic screening.

Moreover, as shown in FIG. 2, in the cylinder head 4, there is formed a communication hole 4a that causes the combustion chamber C to be communicated with the outside. The communication hole 4a includes, from the combustion chamber C side, a first hole part 4b, an inclined part 4c having a diameter gradually increased from a hole diameter of the first hole part 4b, and a second hole part 4d having a hole diameter larger than the hole diameter of the first hole part 4b. In a surrounding wall that forms the second hole part 4d, a female screw 4e, into which a male screw 332a of a housing 30, to be described later, formed in the pressure detecting device 5 is screwed, is formed.

Hereinafter, the pressure detecting device 5 will be described in detail.

Figure 3:
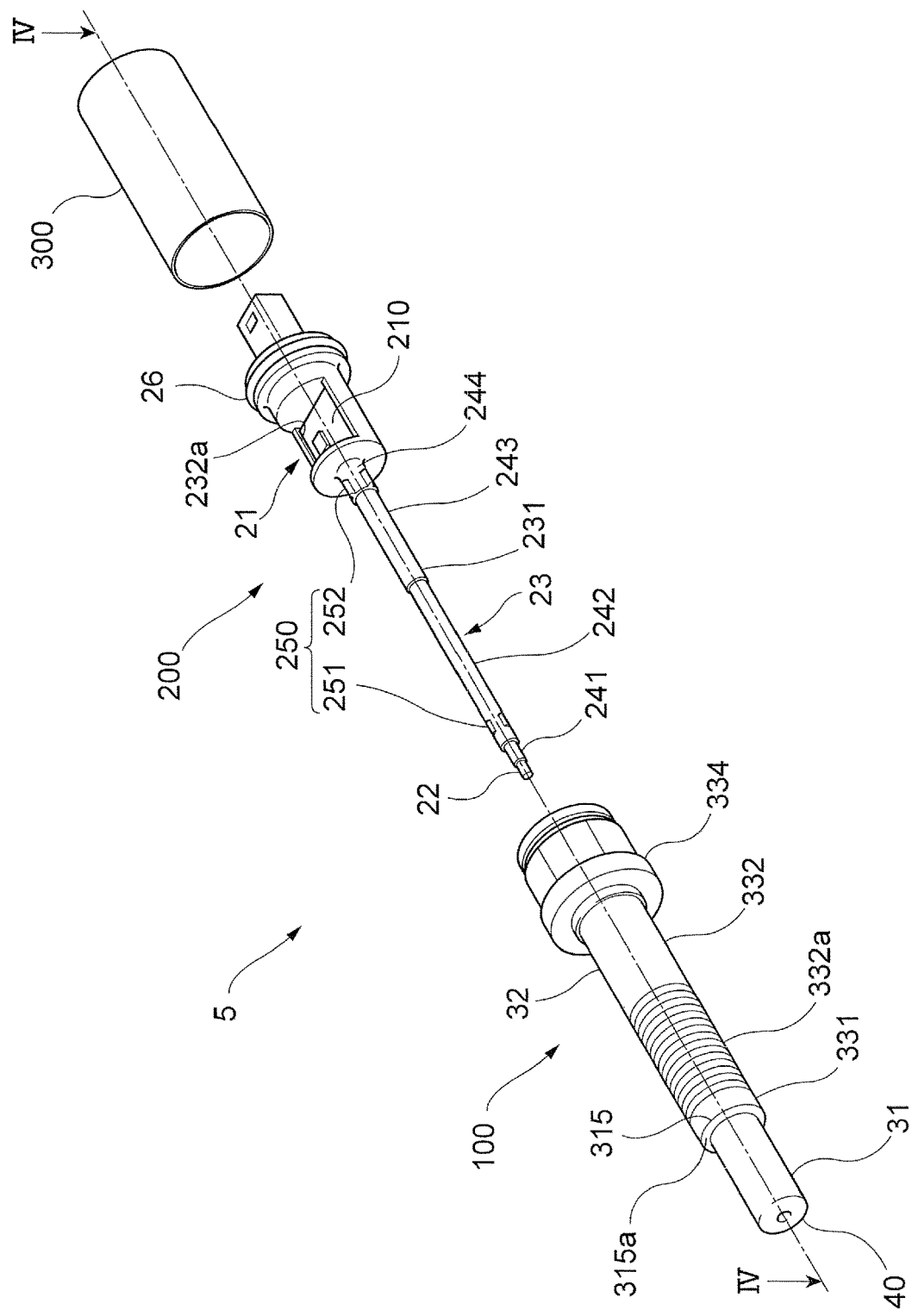
FIG. 3 is a schematic configuration view of the pressure detecting device.
Figure 4:
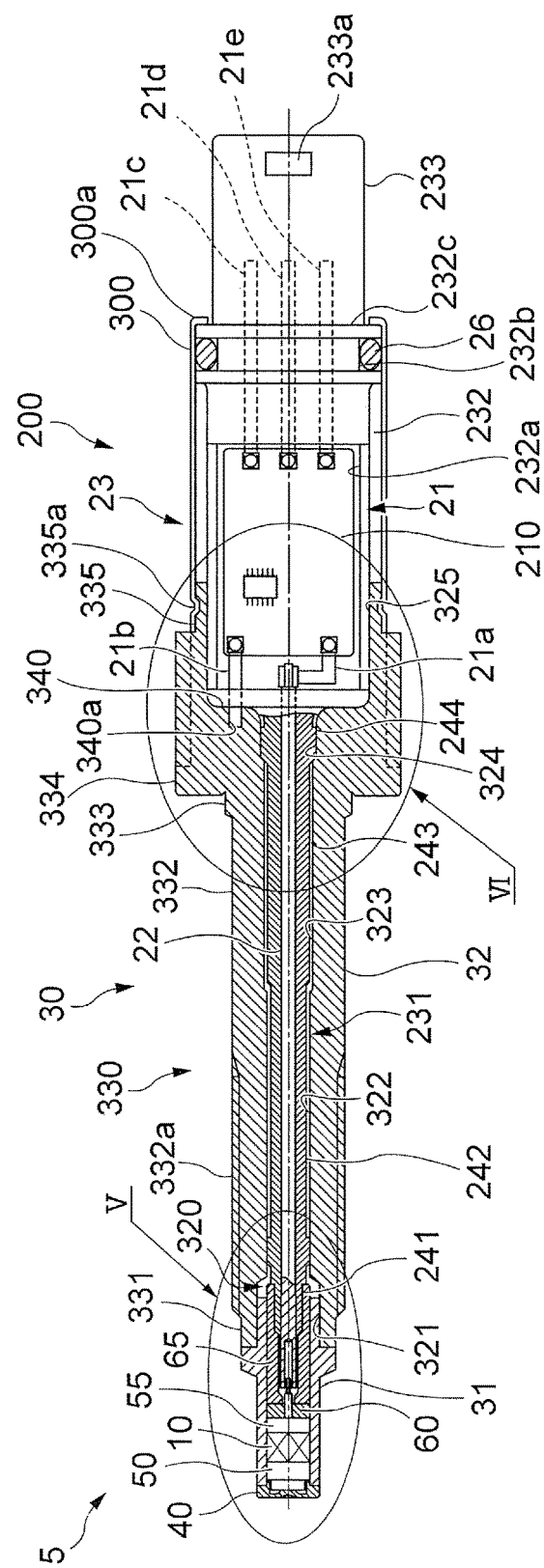
FIG. 4 is a cross-sectional view of a IV-IV part of the pressure detecting device shown in FIG. 3.
Figure 5:
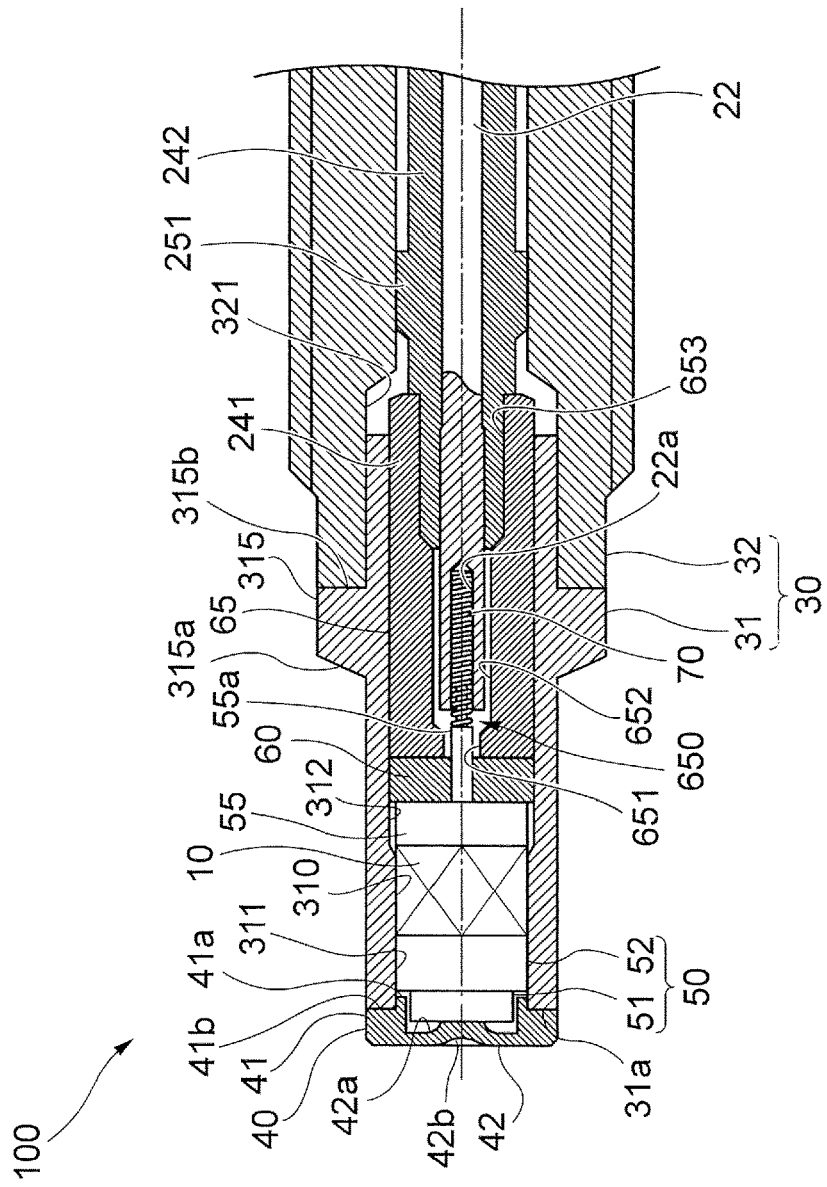
FIG. 5 is an enlarged view of a V part of the pressure detecting device shown in FIG. 4.
Figure 6:
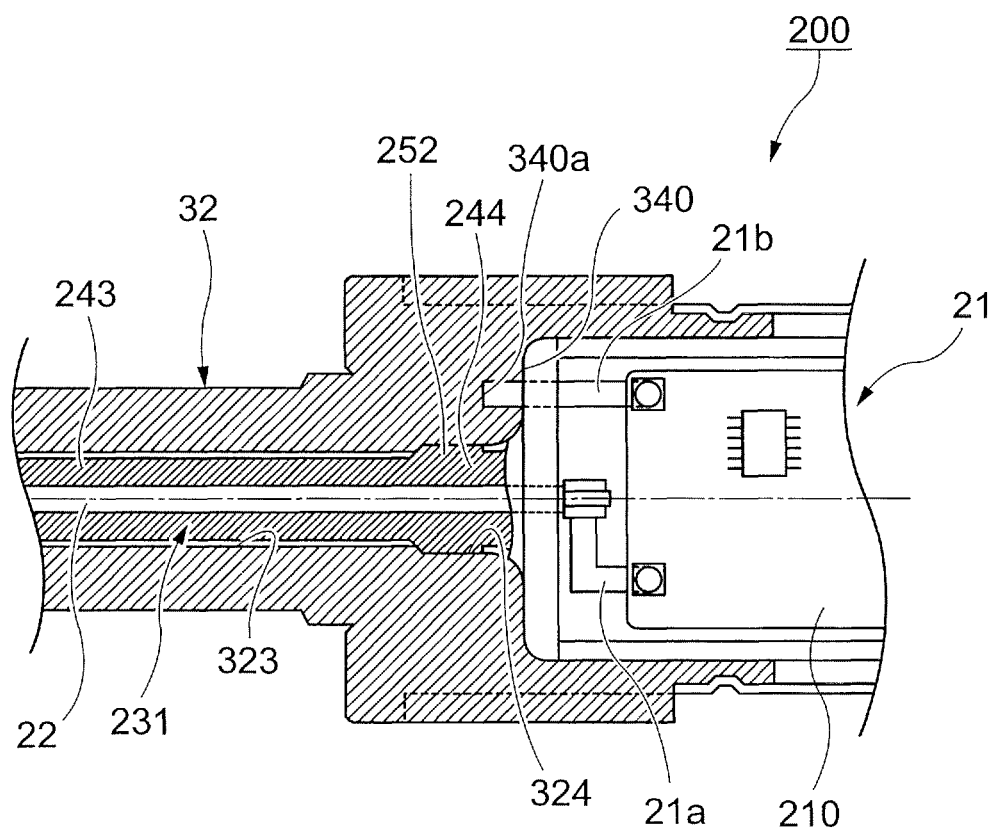
FIG. 6 is an enlarged view of a VI part of the pressure detecting device shown in FIG. 4.

FIG. 3 is a schematic configuration view of the pressure detecting device 5. FIG. 4 is a cross-sectional view of a IV-IV part of the pressure detecting device 5 shown in FIG. 3. FIG. 5 is an enlarged view of a V part of the pressure detecting device 5 shown in FIG. 4. Moreover, FIG. 6 is an enlarged view of a VI part of the pressure detecting device 5 shown in FIG. 4.

The pressure detecting device 5 includes: a sensor part 100 having a piezoelectric element 10 that converts the pressure in the combustion chamber C into an electric signal; a signal processing part 200 that processes the electric signal from the sensor part 100; and a holding member 300 that holds the signal processing part 200. When the pressure detecting device 5 is mounted on the cylinder head 4, a diaphragm head 40, which will be described later, of the sensor part 100 is inserted first into the communication hole 4a formed in the cylinder head 4. In the following description, the left side of FIG. 4 is assumed to be a leading end side of the pressure detecting device 5, and the right side thereof is assumed to be a rear end side of the pressure detecting device 5.

First, the sensor part 100 will be described.
The sensor part 100 includes: the piezoelectric element 10 that converts a received pressure into an electric signal; and a housing 30 in a cylindrical shape, inside of which a hole in a columnar shape to house the piezoelectric element 10 or the like is formed. Hereinafter, the centerline direction of the hole in the columnar shape formed in the housing 30 is simply referred to as a centerline direction.

Moreover, the sensor part 100 includes: the diaphragm head 40 provided to close an opening part on the leading end side in the housing 30, on which the pressure in the combustion chamber C acts; a first electrode part 50 provided between the diaphragm head 40 and the piezoelectric element 10; and a second electrode part 55 disposed on the opposite side of the first electrode part 50 with respect to the piezoelectric element 10.

Moreover, the sensor part 100 includes: an insulating ring 60 made of alumina ceramics that electrically insulates the second electrode part 55; a support member 65 that is provided closer to the rear end side than the insulating ring 60 and supports an end portion of a covering member 23, which will be described later, of the signal processing part 200; and a coil spring 70 interposed between the second electrode part 55 and a conduction member 22, which will be described later.

The piezoelectric element 10 as an example of a detection element includes a piezoelectric body showing a piezoelectric action of a piezoelectric longitudinal effect. The piezoelectric longitudinal effect refers to an action that generates charge on a surface of the piezoelectric body in the direction of a charge generating axis when an external force is applied to a stress application axis in the same direction as the charge generating axis of the piezoelectric body. The piezoelectric element 10 related to the exemplary embodiment is housed in the housing 30 so that the centerline direction thereof is in the direction of the stress application axis.

Next, a case in which piezoelectric transversal effect is used for the piezoelectric element 10 will be exemplified. The piezoelectric transversal effect refers to an action that generates charge on a surface of the piezoelectric body in the direction of a charge generating axis when an external force is applied to a stress application axis in a position orthogonal to the charge generating axis of the piezoelectric body. Plural piezoelectric bodies formed into thin plate shape may be laminated for configuration, and, by laminating in this manner, it is possible to efficiently collect charges generated in the piezoelectric body, to thereby increase sensitivity of a sensor. As the piezoelectric body, use of langasite crystal (langasite, langatate, langanite, LTGA), quartz or gallium phosphate having the piezoelectric longitudinal effect and the piezoelectric transversal effect can be shown as examples. Note that, in the piezoelectric element 10 of the exemplary embodiment, langasite single crystal is used as the piezoelectric body.

As shown in FIG. 5, the housing 30 includes a first housing 31 provided to the leading end side and a second housing 32 provided to the rear end side.

The first housing 31 is a member having a thin cylindrical shape inside of which a columnar-shaped hole 310 with a diameter differing in stages from the leading end side to the rear end side is formed. On the outer circumferential surface thereof, at the center portion in the centerline direction, a projection part 315 that the projects from the outer circumferential surface is provided over an entire region in the circumferential direction.

The hole 310 is configured with a first hole 311 and a second hole 312 having a larger hole diameter than a hole diameter of the first hole 311, which are formed in order from the leading end side to the rear end side. The projection part 315 includes: an inclined surface 315a at the leading end portion thereof, in which the diameter is gradually increased from the leading end side to the rear end side; and a vertical surface 315b perpendicular to the centerline direction at the rear end portion thereof.

The second housing 32 is, as shown in FIG. 4, a member having a cylindrical shape inside of which a columnar-shaped hole 320 with a diameter differing in stages from the leading end side to the rear end side is formed, and outside of which an outer circumferential surface 330 with a diameter differing in stages from the leading end side to the rear end side is provided.

The hole 320 is configured with: a first columnar hole 321 having a first hole diameter; a second columnar hole 322 having a second hole diameter smaller than the first hole diameter; a third columnar hole 323 having a third hole diameter larger than the second hole diameter; a fourth columnar hole 324 having a fourth hole diameter larger than the third hole diameter; and a fifth columnar hole 325 having a fifth hole diameter larger than the fourth hole diameter, which are formed in order from the leading end side to the rear end side.

The first hole diameter in the first columnar hole 321 is set to be not more than the diameter of the outer circumferential surface of the first housing 31 so that the leading end portion in the second housing 32 is fitted (press-fitted) into the rear end portion in the first housing 31 by interference fit.

The outer circumferential surface 330 is configured with: a first outer circumferential surface 331; a second outer circumferential surface 332 having an outer diameter larger than an outer diameter of the first outer circumferential surface 331; a third outer circumferential surface 333 having an outer diameter larger than the outer diameter of the second outer circumferential surface 332; a fourth outer circumferential surface 334 having an outer diameter larger than the outer diameter of the third outer circumferential surface 333; and a fifth outer circumferential surface 335 having an outer diameter smaller than the outer diameter of the fourth outer circumferential surface 334, which are formed from the leading end side to the rear end side.

At the leading end portion in the second outer circumferential surface 332, the male screw 332a to be screwed into the female screw 4e of the cylinder head 4 is formed. Into the third outer circumferential surface 333, a first sealing member 71, which will be described later, is fitted by loose fit, and a dimension tolerance of the outer diameter of the third outer circumferential surface 333 and the inner diameter of the first sealing member 71 is set to, for example, zero to 0.2 mm. The rear end portion in the fourth outer circumferential surface 334 is formed into an equilateral hexagonal prism having six chamfers at regular intervals in the circumferential direction. When the pressure detecting device 5 is fastened to the cylinder head 4, the portion formed into the equilateral hexagonal prism serves as a portion into which a fastening tool is fitted and to which the rotational force imparted to the tool is transmitted. At the center portion in the centerline direction in the fifth outer circumferential surface 335, a concave part 335a that is concaved from the outer circumferential surface is formed over the entire circumference.

Moreover, as shown in FIG. 6, the second housing 32 is a transition portion from the fourth columnar hole 324 to the fifth columnar hole 325, and, at the leading end portion in the fifth columnar hole 325 (refer to FIG. 4), there is provided a butting surface 340, against which an end surface on the leading end side in a board covering part 232 of the covering member 23, to be described later, of the signal processing part 200 is butted. On the butting surface 340, there is formed a pin concave part 340a into which an input-side second connection pin 21b of a circuit board part 21 in the signal processing part 200, which will be described later, is inserted.

The first housing 31 and the second housing 32 exist at positions close to the combustion chamber C; therefore, it is desired that the first housing 31 and the second housing 32 are manufactured by use of materials that can endure the use temperature environment of at least from −40° C. to 350° C. Moreover, since the first housing 31 and the second housing 32 are used for grounding each part housed in the housing 30, it is desired that the first housing 31 and the second housing 32 are manufactured by use of materials having conductivity. Specifically, it is desired to use stainless steel having conductivity and high resistance to heat, such as the JIS standard SUS630, SUS316 or SUS430.

The diaphragm head 40 includes, as shown in FIG. 5, a cylindrical part 41 in a cylindrical shape and an inside part 42 formed inside the cylindrical part 41.

The rear end portion in the cylindrical part 41 includes: an entry part 41a that is fitted (press-fitted) into the leading end portion in the first housing 31 of the housing 30 by interference fit to enter inside the leading end portion; and a butting surface 41b that is formed into the same shape as an end surface 31a in the leading end portion and against which the end surface 31a is butted.

The inside part 42 is a disk-shaped member provided to close an opening of the leading end side in the cylindrical part 41, and at the center portion thereof in a surface of the rear end side, there is provided a projection part 42a that projects from the surface toward the piezoelectric element 10. Moreover, at the center portion in the surface on the leading end side of the inside part 42, there is provided a concave part 42b that is concaved from the surface toward the piezoelectric element 10.

Since existing in the combustion chamber C of high temperature and high pressure, it is desired that the diaphragm head 40 is made of an alloy having high elasticity and excellent durability, resistance to heat, resistance to corrosion or the like, for example, SUH 660.

The first electrode part 50 is a columnar-shaped member formed to have a diameter differing in stages from the leading end side to the rear end side, and is configured with a first columnar part 51 and a second columnar part 52 having a radius larger than a radius of the first columnar part 51. The outer diameter of the first columnar part 51 is smaller than the inner diameter of the entry part 41a of the diaphragm head 40, and the outer diameter of the second columnar part 52 is substantially the same as the hole diameter of the first hole 311 of the first housing 31. Then, components are disposed so that the end surface on the leading end side in the first columnar part 51 is brought into contact with the projection part 42a of the inside part 42 in the diaphragm head 40 and the end surface on the rear end side in the second columnar part 52 is brought into contact with a surface on the leading end side in the piezoelectric element 10. Due to contact of the outer circumferential surface of the second columnar part 52 with the inner circumferential surface of the first housing 31 and/or contact of the end surface on the leading end side in the first columnar part 51 with the diaphragm head 40, the leading end portion in the piezoelectric element 10 is electrically connected to the housing 30.

The first electrode part 50 causes the pressure in the combustion chamber C to act on the piezoelectric element 10, and the end surface on the rear end side in the second columnar part 52, which is the end surface of the piezoelectric element 10 side, is formed in a size capable of pressing an entirety of the end surface of the piezoelectric element 10. Moreover, in the first electrode part 50, both end surfaces in the centerline direction are formed as smooth surfaces and provided substantially in parallel with each other along a surface perpendicular to the centerline direction so as to make it possible to cause the pressure received from the diaphragm head 40 to uniformly act on the piezoelectric element 10.

As a material of the first electrode part 50, stainless steel can be provided as an example.

The second electrode part 55 is a columnar-shaped member and is disposed so that the end surface on the leading end side thereof is brought into contact with the end surface on the rear end side in the piezoelectric element 10 and the end surface on the rear end side thereof is brought into contact with the insulating ring 60. The end surface on the rear end side in the second electrode part 55 is provided with a columnar-shaped projection part 55a that projects from the end surface toward the rear end side. The projection part 55a includes a base end portion on the end surface side and a leading end portion having an outer diameter smaller than an outer diameter of the base end portion. The outer diameter of the projection part 55a is set smaller than the inner diameter of the insulating ring 60 and the length of the projection part 55a is set longer than the width (the length in the centerline direction) of the insulating ring 60, and the leading end of the projection part 55a is exposed from the insulating ring 60. The second electrode part 55 is a member acting to apply a constant load to the piezoelectric element 10 with the first electrode part 50; the end surface thereof on the piezoelectric element 10 side (the leading end side) is formed in a size capable of pressing the entirety of the end surface on the rear end side of the piezoelectric element 10 and is formed as a smooth surface in parallel with the end surface on the rear end side of the piezoelectric element 10. The outer diameter of the second electrode part 55 is set smaller than the hole diameter of the second hole 312 of the first housing 31, and there is a gap between the outer circumferential surface of the second electrode part 55 and the inner circumferential surface of the first housing 31.

As a material of the second electrode part 55, stainless steel can be provided as an example.

The insulating ring 60 is a cylindrical-shaped member formed of alumina ceramics or the like, and the inner diameter (the hole diameter at the center portion) thereof is slightly larger than the outer diameter of the base end portion in the projection part 55a of the second electrode part 55 and the outer diameter thereof is set substantially the same as the hole diameter of the second hole 312 of the first housing 31. Due to that the projection part 55a is inserted into a hole at the center portion of the insulating ring 60, the second electrode part 55 is disposed so that the center position of the second electrode part 55 and the center of the second hole 312 of the first housing 31 are the same.

The support member 65 is a cylindrical-shaped member, inside of which plural columnar-shaped holes 650 having different diameters are formed from the leading end side to the rear end side, and the diameter of the outer circumferential surface thereof is the same.

The hole 650 is configured with a first hole 651, a second hole 652 having a larger hole diameter than a hole diameter of the first hole 651 and a third hole 653 having a larger hole diameter than the hole diameter of the second hole 652, which are formed in order from the leading end side to the rear end side. The hole diameter of the first hole 651 is larger than the outer diameter of the base end portion in the projection part 55a of the second electrode part 55, and the projection part 55a is exposed to the inside of the support member 65. The hole diameter of the second hole 652 is larger than the outer diameter of the leading end portion in the conduction member 22 of the signal processing part 200, which will be described later. The hole diameter of the third hole 653 is smaller than the outer diameter of the end portion on the leading end side in the covering member 23, and the covering member 23 is fitted into the surrounding wall that forms the third hole 653 by interference fit. Consequently, the support member 65 functions as a member supporting the end portion of the covering member 23.

The coil spring 70 has an inner diameter that is not less than the outer diameter of the leading end portion and smaller than the outer diameter of the base end portion in the projection part 55a of the second electrode part 55, and an outer diameter that is smaller than an insertion hole 22a of the conduction member 22, which will be described later. Into the inside of the coil spring 70, the leading end portion of the projection part 55a in the second electrode part 55 is inserted, and the coil spring 70 is inserted into the insertion hole 22a of the conduction member 22, which will be described later. The length of the coil spring 70 is set to a length capable of being interposed between the second electrode part 55 and the conduction member 22 in a compressed state. As a material of the coil spring 70, an alloy having high elasticity and excellent durability, resistance to heat, resistance to corrosion or the like may be used. Moreover, by applying gold plating to the surface of the coil spring 70, electrical conduction may be increased.

Next, the signal processing part 200 will be described.

The signal processing part 200 includes, as shown in FIGS. 3 and 4: the circuit board part 21 that at least performs amplification processing on electric signals (charge signals), which are weak charges obtained from the piezoelectric element 10 of the sensor part 10; the conduction member 22 in a rod shape that guides the charges generated in the piezoelectric element 10 to the circuit board part 21; the covering member 23 that covers the circuit board part 21, the conduction member 22 and so forth; and an O-ring 26 that seals the circuit board part 21 and so forth.

The circuit board part 21 includes a mounting board 210 on which electronic components and so forth constituting a circuit for amplifying the weak charges obtained from the piezoelectric element 10 of the sensor part 100 have been mounted. To the leading end portion in the mounting board 210, an input-side first connection pin 21a for electrically connecting the rear end portion in the conduction member 22 and an input-side second conduction pin 21b for grounding and positioning are connected by soldering or the like. Moreover, to the rear end portion in the mounting board 210, an output-side first connection pin 21c, an output-side second connection pin 21d and an output-side third connection pin 21e for electrically connecting to the controller 6 via the connector 80 provided to the leading end portion of the transmission cable 8 are connected by soldering or the like. Then, the output-side first connection pin 21c is used for supplying the power-supply voltage from the controller 6 to the mounting board 210, the output-side second connection pin 21d is used for supplying the output voltage from the mounting board 210 to the controller 6, and the output-side third connection pin 21e is used for supplying the GND voltage from the controller 6 to the mounting board 210.

The conduction member 22 is a member in a rod shape (columnar shape), and, on the leading end portion thereof, an insertion hole 22a into which the leading end portion of the projection part 55a in the second electrode part 55 is inserted is formed. The rear end portion in the conduction member 22 is electrically connected to the mounting board 210 of the circuit board part 21 via a conductive wire (not shown) and the input-side first connection pin 21a. As materials of the conduction member 22, brass, beryllium copper and the like can be provided as examples. In this case, from the standpoint of processability and costs, brass is desirable. In contrast thereto, from the standpoint of electrical conductivity, high-temperature strength and reliability, beryllium copper is desirable.

The covering member 23 includes: a conduction member covering part 231 that covers outer circumference of the conduction member 22; the board covering part 232 that covers a side surface and a lower surface of the mounting board 210 of the circuit board part 21; and a connector part 233 which covers around the output-side first connection pin 21c, the output-side second connection pin 21d and the output-side third connection pin 21e connected to the mounting board 210 and into which the connector 80 provided to the leading end portion of the transmission cable 8 is fitted.

As shown in FIG. 3, the conduction member covering part 231 extends along the centerline direction and covers the conduction member 22 so that the leading end portion thereof is exposed.

Moreover, the conduction member covering part 231 is configured with plural cylindrical-shaped portions to have an outer diameter differing in stages from the leading end side to the rear end side. Specifically, from the leading end side to the rear end side, a first cylindrical part 241 having a first outer diameter, a second cylindrical part 242 having a second outer diameter smaller than the first outer diameter, a third cylindrical part 243 having a third outer diameter larger than the second outer diameter and a fourth cylindrical part 244 having a fourth outer diameter larger than the third outer diameter are formed side by side.

The first outer diameter in the first cylindrical part 241 is formed larger than the hole diameter of the third hole 653 in the support member 65. Consequently, the leading end portion in the conduction member covering part 231 is fitted (press-fitted) into the surrounding wall that forms the third hole 653 of the support member 65 by interference fit.

As shown in FIG. 3, the conduction member covering part 231 is provided with plural convex parts 250 projecting from the outer circumferential surface of the conduction member covering part 231 and each extending in the centerline direction. In the exemplary embodiment, the convex parts 250 include first convex parts 251 provided to the leading end portion in the second cylindrical part 242 of the conduction member covering part 231 and second convex parts 252 provided to the fourth cylindrical part 244 of the conduction member covering part 231.

In this example, the four first convex parts 251 are provided on the outer circumferential surface of the second cylindrical part 242 at 90-degree intervals along the circumferential direction. Moreover, the four second convex parts 252 are provided on the outer circumferential surface of the fourth cylindrical part 244 at 90-degree intervals along the circumferential direction.

Note that, in this example, the four first convex parts 251 are formed integrally with the second cylindrical part 242 in the conduction member covering part 231, and the four second cylindrical parts 252 are formed integrally with the fourth cylindrical part 244 in the conduction member covering part 231.

In the signal processing part 200, as shown in FIG. 5, each of the four first convex parts 251 provided to the second cylindrical part 242 is butted against the wall forming the second columnar hole 322 in the second housing 32. Moreover, as shown in FIG. 6, each of the four second convex parts 252 provided to the fourth cylindrical part 244 is butted against the wall forming the fourth columnar hole 324 in the second housing 32. Consequently, the conduction member covering part 231 results in being supported by the second housing 32.

The board covering part 232 is basically a portion in a cylindrical shape, and the side surface thereof is provided with a rectangular opening part 232a for placing the mounting board 210 inside thereof. Moreover, on the rear end side in the board covering part 232, a ring groove 232b for the O-ring 26 to seal the inside of the housing 30 and a placing portion of the mounting board 210 is formed.

The connector part 233 is a thin portion formed to project from the end surface 232c on the rear end side in the board covering part 232 to cover around the output-side first connection pin 21c, the output-side second connection pin 21d and the output-side third connection pin 21e connected to the mounting board 210. The rear end portion in the connector part 233 is opened to be capable of receiving the connector 80 provided to the leading end portion of the transmission cable 8 inside thereof. Moreover, on the rear end side in the connector part 233, there is formed a hole 233a that communicates the inside and the outside, and due to a hook provided to the connector 80 of the transmission cable 8 caught in the hole 233a, falling of the connector 80 of the transmission cable 8 from the connector part 233 is suppressed.

The covering member 23 configured as described above is molded from a material having an insulating property, such as resin. Moreover, the covering member 23 is molded integrally with the conduction member 22, the input-side first connection pin 21a, the input-side second connection pin 21b, the output-side first connection pin 21c, the output-side second connection pin 21d and the output-side third connection pin 21e. More specifically, the covering member 23 is molded by pushing heated resin into a mold in which the conduction member 22, the input-side first connection pin 21a, the input-side second connection pin 21b, the output-side first connection pin 21c, the output-side second connection pin 21d and the output-side third connection pin 21e are set.

When the signal processing part 200 is unitized, the mounting board 210 of the circuit board part 21 is inserted from the opening part 232a of the molded covering member 23 to be placed at the center portion of the board covering part 232. In placing the mounting board 210, into a through hole penetrated in a plate thickness direction, the leading end of each of the input-side first connection pin 21a, the input-side second connection pin 21b, the output-side first connection pin 21c, the output-side second connection pin 21d and the output-side third connection pin 21e is passed and soldered. Thereafter, the input-side first connection pin 21a and the conduction member 22 are connected by use of a conductive wire. Moreover, the O-ring 26 is mounted onto the ring groove 232b of the board covering part 232 in the covering member 23. The O-ring 26 is a well-known O-shaped ring made of a fluorine rubber.

Next, the holding member 300 will be described.

The holding member 300 is a thin cylindrical-shaped member and, as shown in FIG. 4, provided with a projection part 300a on the rear end portion, the projection part 300a projecting inward from the inner circumferential surface. After being mounted to the second housing 32, the holding member 300 is crimped by applying pressure to a portion corresponding to the concave part 335a provided to the fifth outer circumferential surface 335. Consequently, the holding member 300 becomes less likely to be moved relative to the housing 30, to thereby prevent the signal processing part 200 from moving with respect to the housing 30.

When the pressure detecting device 5 configured as described above is mounted on the cylinder head 4, the diaphragm head 40 of the sensor part 100 is inserted first into the communication hole 4a formed in the cylinder head 4, and the male screw 332a formed in the second housing 32 of the housing 30 is screwed into the female screw 4e formed in the communication hole 4a of the cylinder head 4.

By mounting the pressure detecting device 5 on the cylinder head 4, the housing 30 is electrically connected to the cylinder head 4 made of metal. Since the cylinder head 4 is in the state of being electrically grounded, in the pressure detecting device 5, the leading end portion in the piezoelectric element 10 is grounded via the housing 30. Here, this example shows a structure in which the side surface of the piezoelectric element 10 is possibly brought into contact with the inner wall surface of the housing 30; however, the piezoelectric element 10 has an extremely large resistance value since being configured with an insulating body and the charges generated with pressure change are generated at both end portions in the centerline direction of the piezoelectric element 10, and therefore, no particular problem occurs.

Here, the sealing member 7 shown in FIG. 1 or the like will be described.

The sealing member 7 includes, as shown in FIG. 2, a first sealing member 71 disposed between an end surface in a fastening direction of the sensor part 100 of the surrounding wall forming the communication hole 4a in the cylinder head 4 and a connecting surface that connects the third outer circumferential surface 333 and the fourth outer circumferential surface 334 of the housing 30 in the pressure detecting device 5. Moreover, the sealing member 7 includes a second sealing member 72 disposed between the inclined part 4c of the communication hole 4a in the cylinder head 4 and the inclined surface 315a (refer to FIG. 3) of the first housing 31 of the housing 30 in the pressure detecting device 5.

Subsequently, a configuration of the mounting board 210 in the circuit board part 21 of the signal processing part 200 will be described.

Figure 7:
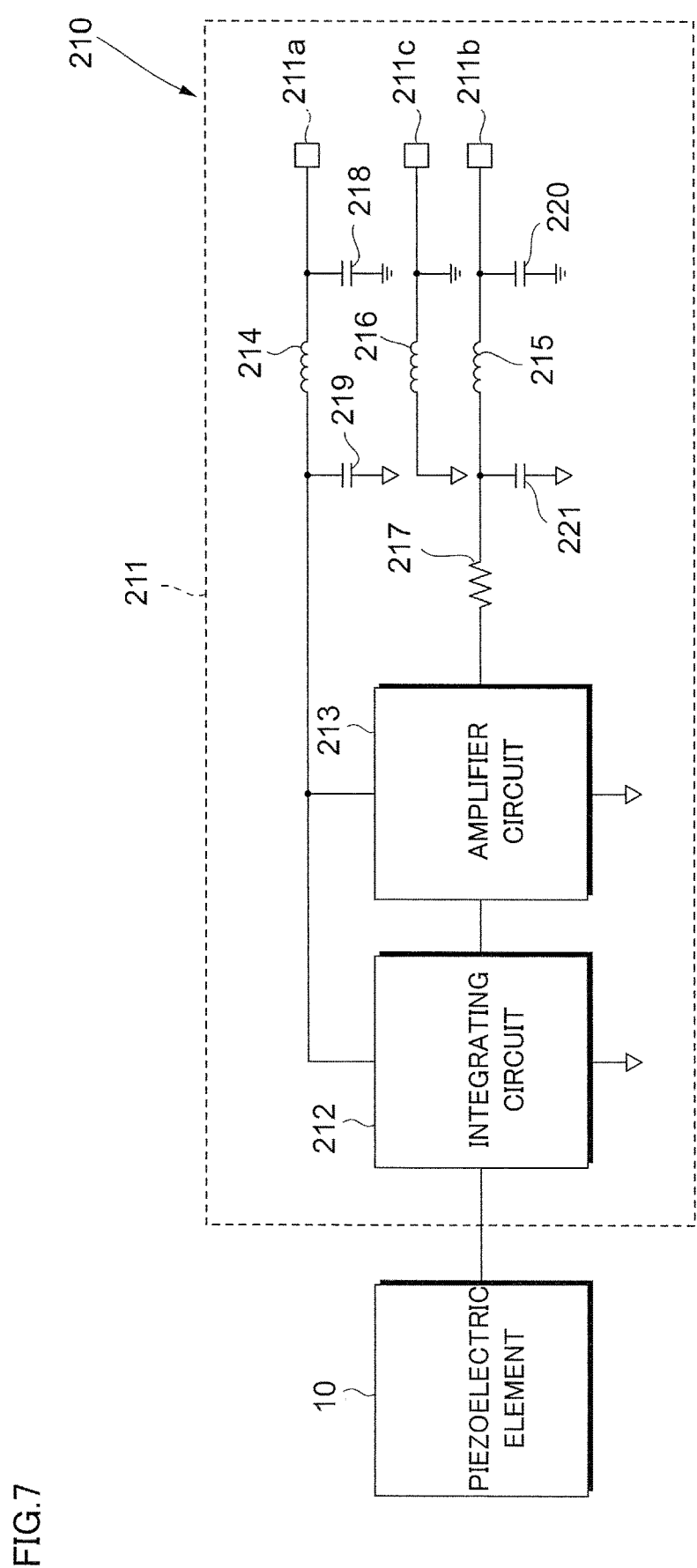
FIG. 7 is a diagram showing a circuit configuration of a mounting board.
Figure 11A:
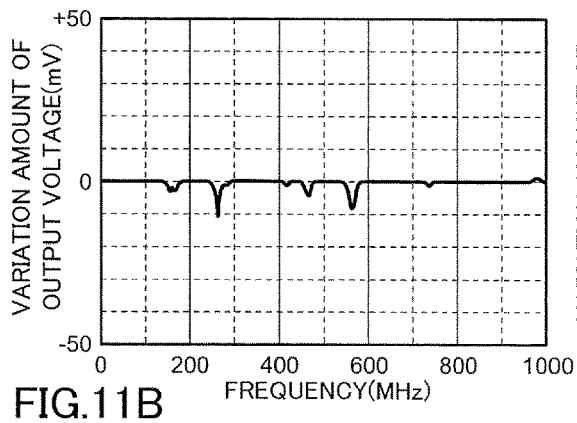
FIGS. 11A to 11H are diagrams each showing a result of a BCI test in each Example and Comparative example as a graph.
Figure 11B:
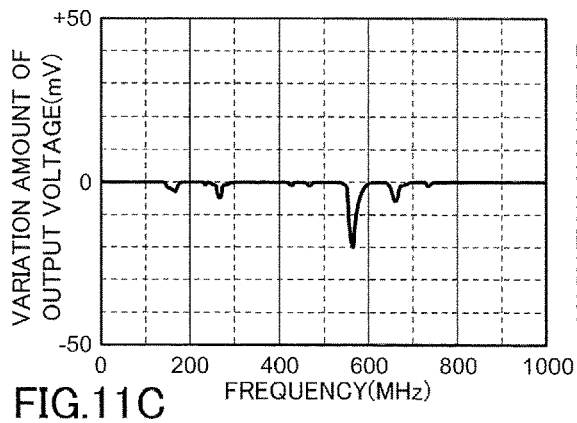
Figure 11C:
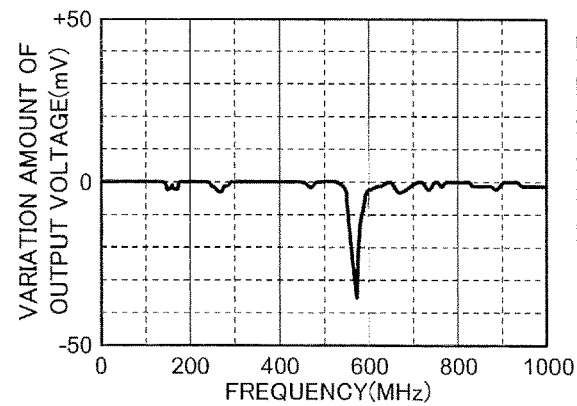
Figure 11D:
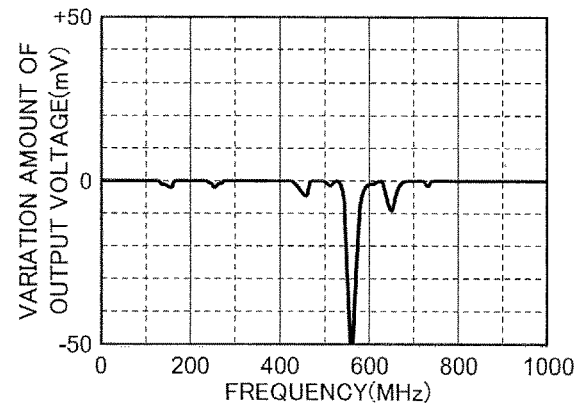
Figure 11E:
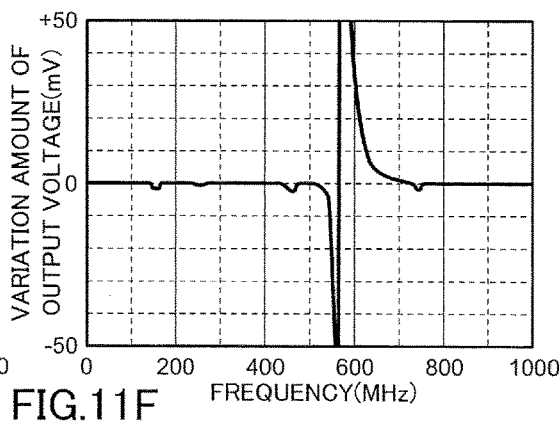
Figure 11F:
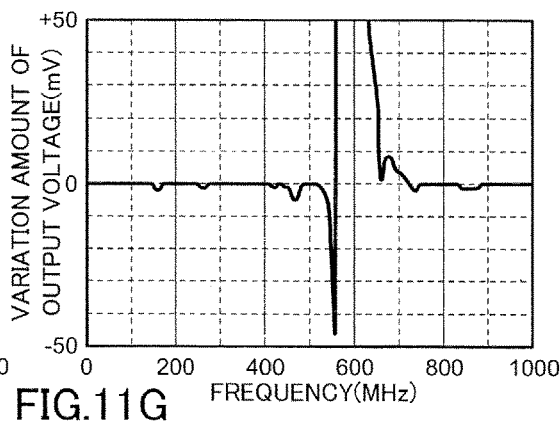
Figure 11G:
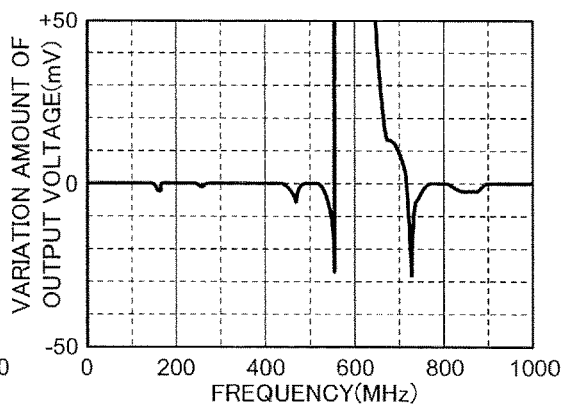
Figure 11H:
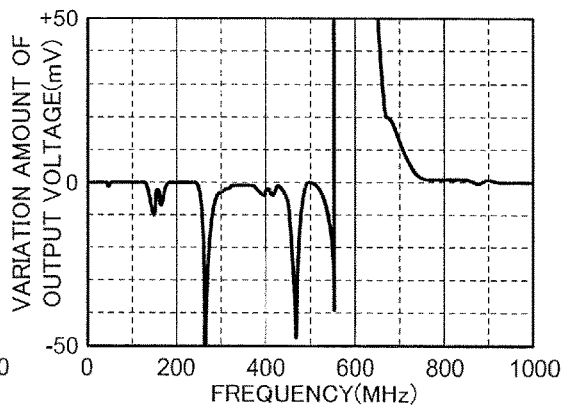

FIG. 7 is a diagram showing a circuit configuration of the mounting board 210.

The circuit board 210 includes a printed wiring board 211 on which wiring (a circuit pattern) for mounting plural electronic components (circuit elements) is formed. Moreover, the mounting board 210 includes an integrating circuit 212 and an amplifier circuit 213 mounted on the printed wiring board 211. Further, the mounting board 210 includes power receiving ferrite beads 214, output ferrite beads 215 and grounding ferrite beads 216 mounted on the printed wiring board 211. Still further, the mounting board 210 includes an output resistance 217, a power receiving first capacitor 218, a power receiving second capacitor 219, an output first capacitor 220 and an output second capacitor 221 mounted on the printed wiring board 211.

In the mounting board 210 of the exemplary embodiment, the charge signal inputted from the piezoelectric element 10 is integrated by the integrating circuit 212 to be converted into the voltage signal, the converted voltage signal is amplified by the amplifier circuit 213, and the obtained output signal is outputted to the outside (for example, the controller 6 shown in FIG. 1). Here, in the exemplary embodiment, the integrating circuit 212 and the amplifier circuit 213 function as an example of a processing circuit.

In the exemplary embodiment, as the printed wiring board 211, a so-called glass-epoxy substrate, which is based on glass fabric base material epoxy resin, is used. Then, the printed wiring board 211 is provided with, as output-side terminals connected to the controller 6, a power receiving terminal 211a, an output terminal 211b and a grounding terminal 211c. Of these, the power receiving terminal 211a is connected to the first cable 81 (refer to FIG. 2) via the output-side first connection pin 21c (refer to FIG. 4). Moreover, the output terminal 211b is connected to the second cable 82 (refer to FIG. 2) via the output-side second connection pin 21d (refer to FIG. 4). Further, the grounding terminal 211c is connected to the third cable 83 (refer to FIG. 2) via the output-side third connection pin 21e (refer to FIG. 4).

To the power receiving terminal 211a, the power-supply voltage received from the controller 6 is supplied. Moreover, the power receiving terminal 211a is connected to a power receiving end of the integrating circuit 212 and a power receiving end of the amplifier circuit 213 via the power receiving ferrite beads 214. Consequently, to the integrating circuit 212 and the amplifier circuit 213, the power-supply voltage is supplied via the power receiving terminal 211a. Further, between the power receiving terminal 211a and the power receiving ferrite beads 214, the power receiving first capacitor 218 is connected in parallel, and, between the power receiving ferrite beads 214 and integrating circuit 212 and the amplifier circuit 213, the power receiving second capacitor 219 is connected in parallel.

From the output terminal 211b, the output terminal toward the controller 6 is outputted. Therefore, the output terminal 211b is connected to an output end of the amplifier circuit 213 via the output ferrite beads 215 and the output resistance 217. Further, between the output terminal 211b and the output ferrite beads 215, the output first capacitor 220 is connected in parallel, and, between the output ferrite beads 215 and the output resistance 217, the output second capacitor 221 is connected in parallel.

To the grounding terminal 211c, the ground of the controller 6 is connected. Moreover, the grounding terminal 211c is connected to a grounding end (ground) of the integrating circuit 212 and a grounding end (ground) of the amplifier circuit 213 via the grounding ferrite beads 216. Here, to the grounding end of the integrating circuit 212 and the grounding end of the amplifier circuit 213, the power receiving second capacitor 219 and the output second capacitor 221 are also connected. Further, between the grounding terminal 211c and the grounding ferrite beads 216, the ground of the mounting board 210 is connected in parallel. Here, to the ground of the mounting board 210, the power receiving first capacitor 218 and the output first capacitor 220 are also connected.

Each of the power receiving ferrite beads 214, the output ferrite beads 215 and the grounding ferrite beads 216 provided to the mounting board 210 are a circuit element in which, in a region where a low frequency is relatively shown, inductance becomes principal rather than resistance, whereas, in a region where a high frequency is relatively shown, the resistance becomes principal rather than the inductance. Here, in the exemplary embodiment, as the power receiving ferrite beads 214 and the output ferrite beads 215, those having characteristics with an impedance value (hereinafter, referred to as a static characteristic nominal value) of 1000Ω at 100 MHz are used. Moreover, in the exemplary embodiment, as the grounding ferrite beads 216, those having characteristics that show the static characteristic nominal value of 5Ω, which is smaller than that of the above-described output ferrite beads 215, are used. Here, in the exemplary embodiment, the grounding ferrite beads 216 function as an example of an inductive element or an inductive/resistive element.

Note that, in place of the power receiving ferrite beads 214, the output ferrite beads 215 and the grounding ferrite beads 216, a coil functioning inductance (inductor) over the low frequency to high frequency may be used. Moreover, in the exemplary embodiment, the ferrite beads (the inductor) are provided to each of the power feeding system via the power receiving terminal 211a, the signal system via the output terminal 211b and the grounded system via the grounding terminal 211c; however, the ferrite beads have to be provided at least to the grounded system, and are not essential to the power feeding system and the signal system.

In the pressure detecting device 5 of the exemplary embodiment, by connecting the grounding ferrite beads 216 in series to the grounded system in the mounting board 210, it is possible to reduce noises incoming to the grounded system from the outside via the transmission cable 8 or the like. Consequently, the ground potential in each of the integrating circuit 212 and the amplifier circuit 213 provided to the mounting board 210 becomes stable, and therefore, it becomes possible to reduce the noises superimposed on the output signal outputted from the amplifier circuit 213 via the signal system.

Moreover, in the pressure detecting device 5 of the exemplary embodiment, in addition thereto, the power receiving ferrite beads 214 were connected in series to the power feeding system in the mounting board 210 and the output ferrite beads 215 were connected in series to the signal system in the mounting board 210. Consequently, it is possible to reduce noises incoming to the power feeding system and the signal system from the outside via the transmission cable 8 or the like.

EXAMPLES

Hereinafter, the present invention will be described in more detail based on Examples. However, the present invention is not limited to the following Examples unless the gist is exceeded.

The present inventors prepared plural pressure detecting devices 5 that are different in presence or absence of each ferrite beads or characteristics thereof in the mounting board 210, and performed evaluation by the BCI (Bulk Current Injection) test.

FIG. 8 is a diagram for explaining model numbers of the power receiving ferrite beads 214, the output ferrite beads 215 and the grounding ferrite beads 216 used in each Example (Examples 1 to 7) and Comparative example. Note that the pressure detecting device 5 described in the above exemplary embodiment corresponds to Example 1 shown in FIG. 8.

Then, description will be given of similarities and differences in each Example (Examples 1 to 7) and Comparative example.

First, in Example 1, FB1 (5Ω) is used as the grounding ferrite beads 216. In contrast thereto, FB2 (10Ω) is used as the grounding ferrite beads 216 in Example 2, FB3 (22Ω) is used as the grounding ferrite beads 216 in Example 3, and FB4 (47Ω) is used as the grounding ferrite beads 216 in Example 4, that are different from Example 1. Moreover, FB5 (120Ω) is used as the grounding ferrite beads 216 in Example 5, FB6 (470Ω) is used as the grounding ferrite beads 216 in Example 6, and FB7 (1000Ω) is used as the grounding ferrite beads 216 in Example 7, that are different from Example 1. On the other hand, the comparative example is different from Examples 1 to 7 in the point that the grounding ferrite beads 216 are not used (not connected).

Moreover, in Examples 1 to 7 and Comparative example, the point that FB7 (1000Ω) is used as the power receiving ferrite beads 214 and the output ferrite beads 215 is in common.

FIG. 9 includes diagrams for illustrating frequency characteristics of impedance of various kinds of ferrite beads used in each example (Examples 1 to 7) and comparative example. Here, FIG. 9A shows the frequency characteristics of FB1 (5Ω) used as the grounding ferrite beads 216 in Example 1, FIG. 9B shows the frequency characteristics of FB2 (10Ω) used as the grounding ferrite beads 216 in Example 2, and FIG. 9C shows the frequency characteristics of FB3 (22Ω) used as the grounding ferrite beads 216 in Example 3. Moreover, FIG. 9D shows the frequency characteristics of FB4 (47Ω) used as the grounding ferrite beads 216 in Example 4, FIG. 9E shows the frequency characteristics of FB5 (120Ω) used as the grounding ferrite beads 216 in Example 5, and FIG. 9F shows the frequency characteristics of FB6 (470Ω) used as the grounding ferrite beads 216 in Example 6. Further, FIG. 9G shows the frequency characteristics of FB7 (1000Ω) used as the power receiving ferrite beads 214 and as the output ferrite beads 215 in Examples 1 to 7, and used as the grounding ferrite beads 216 in Example 7.

Here, in each of FIGS. 9A to 9G, the horizontal axis indicates the frequency (1 MHz to 3000 MHz) and the vertical axis indicates the impedance (Ω). Moreover, in FIGS. 9A to 9G, as the impedance, three factors, namely, the resistance component R, the (inductive) reactance component X, and the impedance value Z obtained by synthesizing the resistance component R and the resistance component X ($Z=R+jX$) are described.

As is also clear from FIGS. 9A to 9G, the ferrite beads function as an inductance in a region with relatively low frequency, whereas, in a region with relatively high frequency, function as a resistance. However, the magnitude of the impedance value Z, that is, the static characteristic nominal value at 100 MHz differs in each case. Moreover, a frequency at which the resistance component R and the reactance component X cross, namely, an R-X cross point where the main function switches from the inductance to the resistance (or, from the resistance to the inductance) also differs in each case. Further, a frequency at which the impedance value Z shows a maximum, that is, from another standpoint, a self-resonant frequency at which the reactance component X becomes 0 differs in each case. Note that, the reason why the reactance component X of the ferrite beads becomes 0 is that the ferrite beads function as the capacitor, not the inductor, at a frequency region higher than the self-resonant frequency.

FIG. 10 is a diagram for explaining various kinds of characteristics of the various kinds of ferrite beads used in each Example (Examples 1 to 7) and Comparative example as a list. Here, in FIG. 10, the model number of each of the various kinds of ferrite beads and the static characteristic nominal value, the R-X cross point and the self-resonant frequency thereof are associated.

As shown in FIG. 9A and FIG. 10, the static characteristic nominal value of FB1 is 5Ω. Moreover, the R-X cross point thereof is of the order of 1300 MHz, and the self-resonant frequency thereof exceeds 3000 MHz.

As shown in FIG. 9B and FIG. 10, the static characteristic nominal value of FB2 is 10Ω. Moreover, the R-X cross point thereof is of the order of 1000 MHz, and the self-resonant frequency thereof is of the order of 1700 MHz.

As shown in FIG. 9C and FIG. 10, the static characteristic nominal value of FB3 is 22Ω. Moreover, the R-X cross point thereof is of the order of 800 MHz, and the self-resonant frequency thereof is of the order of 1000 MHz.

As shown in FIG. 9D and FIG. 10, the static characteristic nominal value of FB4 is 47Ω. Moreover, the R-X cross point thereof is of the order of 200 MHz, and the self-resonant frequency thereof is of the order of 1100 MHz.

As shown in FIG. 9E and FIG. 10, the static characteristic nominal value of FB5 is 120Ω. Moreover, the R-X cross point thereof is of the order of 180 MHz, and the self-resonant frequency thereof is of the order of 600 MHz.

As shown in FIG. 9F and FIG. 10, the static characteristic nominal value of FB6 is 470Ω. Moreover, the R-X cross point thereof is of the order of 18 MHz, and the self-resonant frequency thereof is of the order of 370 MHz.

As shown in FIG. 9G and FIG. 10, the static characteristic nominal value of FB7 is 1000Ω. Moreover, the R-X cross point thereof is of the order of 180 MHz, and the self-resonant frequency thereof is of the order of 420 MHz.

Note that, regarding the ferrite beads, in some cases, even though the static characteristic nominal values are the same, the frequency characteristics thereof (including the R-X cross point and the self-resonant frequency) possibly differ.

Next, the BCI test used in evaluating the pressure detecting device 5 will be simply described.

The BCI test is the one determined as the immunity standards corresponding to, of the EMC (Electromagnetic Compatibility) standards of vehicle, EMS (Electromagnetic Susceptibility), which is prescribed in, for example, ISO 11452-4:2011.

Note that, this time, the BCI test was conducted in a state where the transmission cable 8 was attached to the pressure detecting device 5, whereas, the housing 30 of the pressure detecting device 5 was insulated from the outside via an air layer or the like. Here, the length of the transmission cable 8 (the first cable 81 to the third cable 83) was set to 1 m. Moreover, application of noises to the transmission cable 8 in the BCI test was performed to the position of 150 mm from the connector 80. Further, the noises to be applied to the transmission cable 8 were prepared by an AM modulation system, and the range of frequency of the noises to be applied was set to more than 0 and not more than 1000 MHz (1 GHz). Then, in a state where the noises were applied to the transmission cable 8, a variation amount of the voltage between the output terminal 211b and the grounding terminal 211c provided to the mounting board 210 (hereinafter, referred to as an output voltage variation amount) was measured. Note that, in ISO 11452-4:2011, the frequency range of the noise to be applied is determined to 1 MHz to 400 MHz; this time, measurement was conducted with a frequency range broader than this.

FIG. 11 includes diagrams each explaining the result of the BCI test in each Example (Examples 1 to 7) and Comparative example as a graph. Here, FIG. 11A shows a result of Example 1, FIG. 11B shows a result of Example 2, FIG. 11C shows a result of Example 3, FIG. 11D shows a result of Example 4, FIG. 11E shows a result of Example 5, FIG. 11F shows a result of Example 6, FIG. 11G shows a result of Example 7, and FIG. 11H shows a result of Comparative example.

Here, in each of FIGS. 11A to 11H, the horizontal axis indicates the frequency (0 MHz to 1000 MHz) and the vertical axis indicates the output voltage variation amount (mV).

FIG. 12 is a diagram for explaining the result of the BCI test in each Example (Examples 1 to 7) and Comparative example as a list. Here, in FIG. 12, each of Examples and Comparative example is associated with the maximum value (MAX) and the minimum value (MIN) of the output voltage (output signal) and the variation amount of the output voltage, which is a difference between the two, in each case. However, in FIG. 12, the results measured in the frequency range prescribed in ISO 11452-4:2011 (measurement frequency: 0 MHz to 400 MHz) are described as "Basic BCI test results", and the results measured in the frequency range extended than this are described as "Extended BCI test results".

First, "Basic BCI test results" with the range of measurement frequency of 0 MHz to 400 MHz will be described.

In Example 1, the output voltage variation amount was 11 mV (265 MHz), in Example 2, the output voltage variation amount was 5 mV (265 MHz), in Example 3, the output voltage variation amount was 3 mV (270 MHz), and, in Example 4, the output voltage variation amount was 2 mV (265 MHz). Moreover, in Example 5, the output voltage variation amount was 1 mV (265 MHz and many other frequencies), in Example 6, the output voltage variation amount was 2 mV (150 MHz and many other frequencies), and, in Example 7, the output voltage variation amount was 3 mV (160 MHz). In contrast thereto, in Comparative example, the output voltage variation amount was 56 mV (265 MHz).

From the above-described "Basic BCI test results", it is known that, in the range of measurement frequency of 0 MHz to 400 MHz, as in Examples 1 to 7, by connecting the grounding ferrite beads 216 in series to the grounded system of the mounting board 210, the noises superimposed on the output voltage (output signal) are reduced, as compared to the case in which, as in Comparative example, the grounding ferrite beads 216 are not connected in series to the grounded system of the mounting board 210. Moreover, it is known that, as in Comparative example, when there is provided a configuration in which the ferrite beads are connected only to the power feeding system and the signal system (the ferrite beads are not connected to the grounded system), the noised superimposed on the output voltage (output signal) are not reduced.

Subsequently, "Extended BCI test results" with the range of measurement frequency of 0 MHz to 1000 MHz will be described.

In Example 1, the output voltage variation amount was 11 mV (266 MHz), in Example 2, the output voltage variation amount was 20 mV (566 MHz), in Example 3, the output voltage variation amount was 35 mV (577 MHz), and, in Example 4, the output voltage variation amount was 54 mV (566 MHz). Moreover, in Example 5, the output voltage variation amount was 208 mV (577 MHz), in Example 6, the output voltage variation amount was not less than 1515 mV (566 MHz), and, in Example 7, the output voltage variation amount was not less than 15 mV (566 MHz). In contrast thereto, in Comparative example, the output voltage variation amount was not less than 1515 mV (566 MHz). Here, an upper limit value of the output voltage variation amount in the measurement system used in Examples is 1515 mV. Consequently, "not less than 1515 mV" means that the measurement limit of the output voltage variation amount is exceeded. Accordingly, in Examples 6, 7 and Comparative example, the results exceeding an upper limit of the maximum value (MAX) of the output voltage are obtained; therefore, it is estimated that the actual output voltage variation amount is larger than the above value (1515 mV).

From the above-described "Extended BCI test results", it is known that, in the range of measurement frequency of 0 MHz to 1000 MHz, as in Examples 1 to 3, by connecting the grounding ferrite beads 216, whose reactance component X does not become 0 (exceeding 0Ω) within the range of the measurement frequency, in series to the grounded system of the mounting board 210, the noises superimposed on the output voltage (output signal) are reduced, as compared to the case in which, as in Examples 4 to 7, the grounding ferrite beads 216, whose reactance component X becomes 0 within the range of the measurement frequency, are connected in series to the grounded system of the mounting board 210. Moreover, as a matter of course, it is known that, as in Examples 1 to 3, by connecting the grounding ferrite beads 216, whose reactance component X does not become 0 within the range of the measurement frequency, in series to the grounded system of the mounting board 210, the noises superimposed on the output voltage (output signal) are reduced, as compared to the case in which, as in Comparative example, the grounding ferrite beads 216 are not connected in series to the grounded system of the mounting board 210.

Here, the term ferrite beads whose reactance component X does not become 0 within the range of measurement frequency is synonymous with the self-resonant frequency of the ferrite beads set higher than the range of the measurement frequency.

Note that, in the exemplary embodiment, description was given by taking the pressure detecting device 5 that detects the combustion pressure of the internal combustion engine 1 by use of the piezoelectric element 10 as an example; however, the present invention is not limited thereto. For example, the present invention may be applied to a detecting device that detects various kinds of physical amounts, such as the temperature, the humidity or the flow rate, or a detecting system including the detecting device.

REFERENCE SIGNS LIST

1 . . . Internal combustion engine
2 . . . Cylinder block
3 . . . Piston
4 . . . Cylinder head
5 . . . Pressure detecting device
6 . . . Controller
8 . . . Transmission cable
10 . . . Piezoelectric element
21 . . . Circuit board part
22 . . . Conduction member
23 . . . Covering member
30 . . . Housing
80 . . . Connector
81 . . . First cable
82 . . . Second cable
83 . . . Third cable
100 . . . Sensor part
200 . . . Signal processing part
210 . . . Mounting board
211 . . . Printed wiring board
212 . . . Integrating circuit
213 . . . Amplifier circuit
214 . . . Power receiving ferrite beads
215 . . . Output ferrite beads
216 . . . Grounding ferrite beads
300 . . . Holding member

The invention claimed is:

1. A detecting device comprising:
a detection element that detects a change in a physical amount;
a processing circuit that applies electrical processing to a detection signal outputted by the detection element;
a power receiving terminal connected to a power supply provided outside;
an output terminal connected to a processing device provided outside;
a grounding terminal connected to a ground body provided outside;

a power receiving ferrite bead connected to the power receiving terminal and a power receiving end in the processing circuit;
an output ferrite bead connected to the output terminal and an output end in the processing circuit; and
a grounding ferrite bead connected to the grounding terminal and a grounding end in the processing circuit, wherein
a static characteristic nominal value of the grounding ferrite head is smaller than each static characteristic nominal value of the power receiving ferrite bead and the output ferrite bead, and
an R-X cross point of the grounding ferrite bead is higher than each R-X cross point of the power receiving ferrite bead and the output ferrite bead.

2. The detecting device according to claim 1, wherein a self-resonant frequency of the grounding ferrite bead is higher than each self-resonant frequency of the power receiving ferrite head and the output ferrite bead.

3. The detecting device according to claim 1, wherein a magnitude of a reactance component of the grounding ferrite head exceeds 0Ω in a frequency range of more than 0 Hz and not more than 400 MHz.

4. The detecting device according to claim 1, wherein a magnitude of an impedance of the grounding ferrite bead exceeds 0Ω and is not more than 50Ω at 100 MHz.

5. A detecting device comprising:
a detection element that detects a change in a physical amount;
a processing circuit that applies electrical processing to a detection signal outputted by the detection element;
a power receiving terminal connected to a power supply provided outside;
an output terminal connected to a processing device provided outside;
a grounding terminal connected to a ground body provided outside;
a power receiving ferrite bead connected to the power receiving terminal and a power receiving end in the processing circuit;
an output ferrite bead connected to the output terminal and an output end in the processing circuit; and
a grounding ferrite bead connected to the grounding terminal and a grounding end in the processing circuit, wherein
a static characteristic nominal value of the grounding ferrite bead is smaller than each static characteristic nominal value of the power receiving ferrite bead and the output ferrite bead, and
a self-resonant frequency of the grounding ferrite bead is higher than each self-resonant frequency of the power receiving ferrite bead and the output ferrite bead.

6. The detecting device according to claim 5, wherein a magnitude of a reactance component of the grounding ferrite bead exceeds 0Ω in a frequency range of more than 0 Hz and is not more than 400 MHz.

7. The detecting device according to claim 5, wherein a magnitude of an impedance of the grounding ferrite bead exceeds 0Ω and is not more than 50Ω at 100 MHz.

8. A detecting system comprising:
a detecting device comprising: a detection element that detects a change in a physical amount; a processing circuit that applies electrical processing to a detection signal outputted by the detection element;
a power receiving terminal connected to a power supply provided outside; an output terminal connected to a processing device provided outside;
a grounding terminal connected to a ground body provided outside;
a power receiving ferrite bead connected to the power receiving terminal and a power receiving end in the processing circuit;
an output ferrite bead connected to the output terminal and an output end in the processing circuit; and
a grounding ferrite bead connected to the grounding terminal and a grounding end in the processing circuit; and
a supplying/processing device that is connected to the detecting device via a supply line for supplying power-supply voltage from the power supply to the processing circuit via the power receiving terminal,
a transmission line for transmitting an output signal outputted from the processing circuit via the output terminal to the processing device and a ground line to be connected to the grounding terminal of the processing circuit, to supply the power-supply voltage to the detecting device and to apply processing to the output signal inputted from the detecting device, the supplying/processing device including the power supply and the processing device, wherein
a static characteristic nominal value of the grounding ferrite bead is smaller than each static characteristic nominal value of the power receiving ferrite bead and the output ferrite bead, and
an R-X cross point of the grounding ferrite bead is higher than each R-X cross point of the power receiving ferrite bead and the output ferrite head.

9. A detecting system comprising:
a detecting device comprising:
a detection element that detects a change in a physical amount;
a processing circuit that applies electrical processing to a detection signal outputted by the detection element;
a power receiving terminal connected to a power supply provided outside; an output terminal connected to a processing device provided outside; a grounding terminal connected to a ground body provided outside; a power receiving ferrite bead connected to the power receiving terminal and a power receiving end in the processing circuit;
an output ferrite bead connected to the output terminal and an output end in the processing circuit; and
a grounding ferrite bead connected to the grounding terminal and a grounding end in the processing circuit; and
a supplying/processing device that is connected to the detecting device via a supply line for supplying power-supply voltage from the power supply to the processing circuit via the power receiving terminal, a transmission line for transmitting an output signal outputted from the processing circuit via the output terminal to the processing device and a ground line to be connected to the grounding terminal of the processing circuit, to supply the power-supply voltage to the detecting device and to apply processing to the output signal inputted from the detecting device, the supplying/processing device including the power supply and the processing device, wherein:
a static characteristic nominal value of the grounding ferrite bead is smaller than each static characteristic nominal value of the power receiving ferrite bead and the output ferrite bead, and a self-resonant frequency of the grounding ferrite bead is higher than each self-resonant frequency of the power receiving ferrite bead and the output ferrite bead.

* * * * *